April 28, 1942.  C. P. WALKER  2,281,301
MEANS FOR DETERMINING THE LOCATION OF OBSTRUCTIONS IN WELLS
Filed Nov. 14, 1940  2 Sheets-Sheet 1
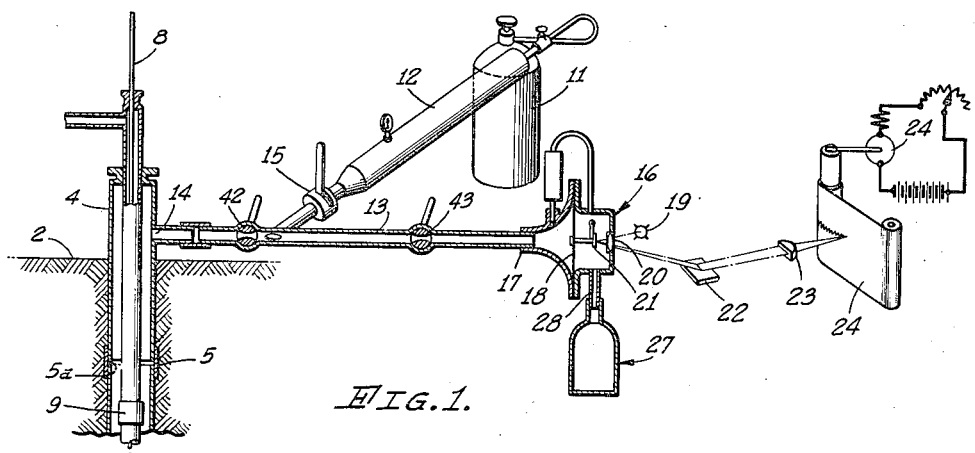
FIG.1.
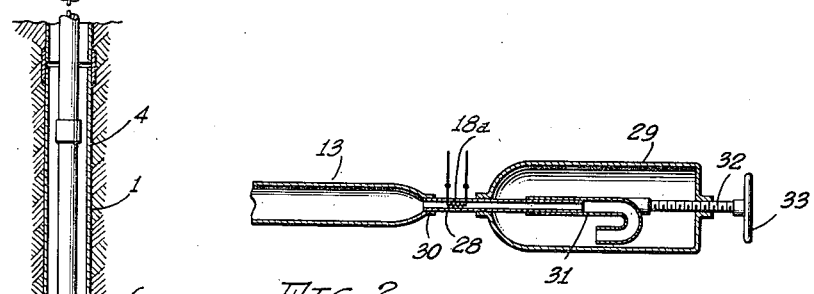
FIG.2.
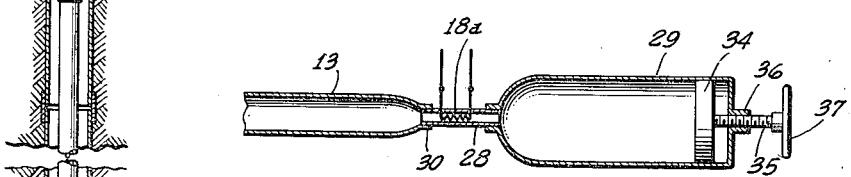
FIG.3.
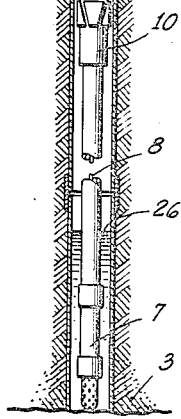
CRANFORD P. WALKER
INVENTOR.
BY Harold W. Mattingly
ATTORNEY.

April 28, 1942.  C. P. WALKER  2,281,301
MEANS FOR DETERMINING THE LOCATION OF OBSTRUCTIONS IN WELLS
Filed Nov. 14, 1940  2 Sheets-Sheet 2

CRANFORD P. WALKER
INVENTOR.

BY *Harold W. Mattingly*
ATTORNEY.

Patented Apr. 28, 1942

2,281,301

UNITED STATES PATENT OFFICE 2,281,301

MEANS FOR DETERMINING THE LOCATION OF OBSTRUCTIONS IN WELLS

Cranford P. Walker, San Marino, Calif.

Application November 14, 1940, Serial No. 365,603

7 Claims. (Cl. 181—0.5)

My invention relates to the art of readily determining the location of fluid levels or other obstructions of unknown location in deep wells such as oil wells by registering acoustical echoes from a number of obstructions in the well including the unknown obstruction, and then comparing the time relation between the registration of echoes from obstructions of known location with echoes from the unknown obstructions.

In my United States Letters Patent No. 2,156,519, issued May 2, 1939, I have illustrated and described the manner in which a pressure impulse may be introduced into a well to produce a pressure wave therein and the manner of registering the echoes from various obstructions in the well, such as the tubing collars or couplings employed to interconnect the sections of the tubing string, the tubing catcher and liner top, as well as the echo from the fluid surface, so that by comparing the time-distance relation along a record tape of the echoes from obstructions of known location, such as the tubing catcher or tubing collars, and the time-distance relation along the tape of the echo from the fluid surface, an accurate determination of the location of the fluid level or any other unknown obstruction within the well may be obtained.

For the purpose of determining many of the characteristics of an oil well which must be known for the most efficient production from a given well and for the proper and equitable enforcement of production curtailment regulations, the location of the fluid level in the well under different conditions of pressure and production rates is employed and in order to permit such information to be obtained without the necessity of removing the pump tubing, pumps, sucker rods and other apparatus from the well, the pressure wave-echo method has been developed, consisting essentially in creating within the well a pressure impulse as by producing a shock at some point within the well and then recording the echoes of such pressure impulse or shock in the relation of the time lapse between the creation of the impulse and the arrival at some predetermined recording point of the echoes from the various obstructions along the length of the well or recording the time lapse relation between the arrival of the echoes from several different obstructions of either known or unknown location, from which the location or depth of the unknown obstructions may be accurately determined or calculated.

As will be understood by those skilled in this art, the ordinary oil well will usually include a string of casing and a string of oil flow tubing, each of which consists essentially of a series of sections of pipe interconnected by means of couplings or joints, the tubing collar joints presenting shoulders projecting into and restricting the effective cross sectional area of the well at each of such joints, while the casing joints provide enlargements at each joint, both types of pipe joints producing reflection echoes which can be registered at the ground surface. Other obstructions or restrictions in the cross sectional area of the well may be comprised of tubing catchers and liner tops while the surface of the column of fluid in the well likewise constitutes an obstruction from each of which obstructions the pressure wave created by the pressure impulse will be reflected as separate and distinct echoes. The echoes from these various obstructions when recorded may be distinguished from each other so that from the record chart the echo from any particular obstruction may be identified and its location on the record chart with reference to echoes registered thereon from other obstructions may be observed and the information so secured employed in the various calculations and determinations sought by the engineer.

As was described in my aforementioned patent, one such system may include a means for producing a pressure impulse in the annular space between the casing and the oil flow tubing in the well, together with a pressure responsive device which will be affected by the pressure variations resulting from the arrival of the echoes of the impulse from the various obstructions in the particular well under measurement, together with a suitable recording apparatus which will register or record these echoes. Also, as is fully described in said patent, it frequently occurs that secondary vibrations and reverberations may be set up within the well due to the interference between the echoes from the various obstructions which interfere with the distinctness with which some of the echoes are received and recorded, making it difficult, if not impossible, to readily distinguish echoes from one character of obstructions from the echoes received from another character of obstruction. One particular difficulty is that resulting from the interference between the uniformly spaced compression echoes from tubing collars and other regularly spaced rarefaction echoes from casing joints since the casing section lengths are usually different from the tubing section lengths and at intervals the two types of echoes either coincide or so nearly so as to obliterate each other or to become so intermingled as to defy recognition.

It is therefore an object of my invention to provide in such system a ready means for suppressing or filtering out of undesired echoes or pressure variations which result from reverberations and interferences of the pressure waves within the well.

Another object of my invention is to provide a system of the character described with an improved means for selectively accenting or amplifying the echoes from certain selected kinds of obstructions, thus permitting them to be distinguished readily from the echoes of other obstructions.

Another object of my invention is to provide a system of the character set forth with a relatively simple adjustable mechanism by which a selection between the desired and undesired echoes may be made to suppress the undesired ones and to accent or amplify the desired ones.

Other objects and advantages of my invention will be apparent from a study of the following specifications, read in connection with the accompanying drawings, wherein—

Fig. 1 is a diagrammatic view illustrating a typical well cross section to which has been coupled apparatus for determining the location of the fluid level or other obstructions in the well and equipped with one form of my improved echo selecting apparatus;

Fig. 2 is a detail diagrammatic view of a portion of apparatus of the character shown in Fig. 1 and illustrating the adaptation of my echo selecting device to a hot wire type of pressure responsive device;

Fig. 3 is a detail view similar to Fig. 2 but illustrating a modified form of echo selecting apparatus which may be employed;

Figure 4:
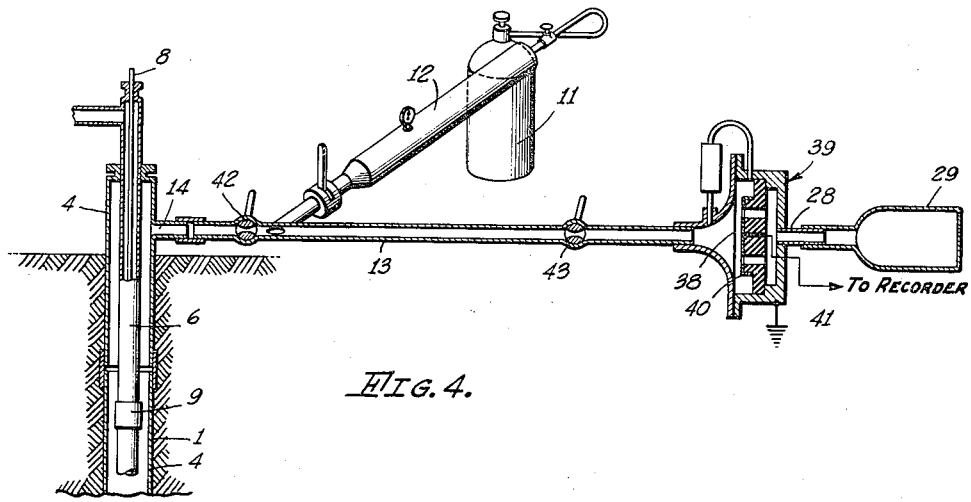
Fig. 4 is a diagrammatic view similar to Fig. 1 and illustrating the adaptation of my echo selecting apparatus applied to a condenser type of pressure responsive apparatus.

Referring to the drawings, I have illustrated in Fig. 1 a typical cross section of an oil well as comprising an earth bore 1 extending from the ground surface 2 to the oil bearing sands 3. The earth bore is usually lined with a string of casing consisting of relatively large diameter pipe sections 4 interconnected with each other by means of suitable joints or couplings 5. Thus at each of the joints a shoulder or recess 5a is presented to the interior of the casing which constitutes at that point an enlargement of the cross sectional area defined by the interior of the casing sections. A second pipe or string of pipes 6 extends down through the casing 4 to constitute an oil flow tubing at the lower end of which may be located a suitable pump 7 which may be reciprocated by means of a string of sucker rods 8 extending through the tubing string 6 to the ground surface where the sucker rods may be engaged and reciprocated by suitable pumping apparatus, not shown. The tubing string 6, like the casing string 4, is usually composed of a plurality of pipe sections interconnected by means of joints or collars 9 which, like the joints in the casing, constitute at their locations changes from the normal cross sectional area of the annular space between the casing and the tubing and hence act as reflecting obstructions to pressure waves passing through such annular space.

Other obstructions which are frequently encountered in the well are typically illustrated in Fig. 1, such as a tubing catcher 10 located some distance above the pump 7 while, as will be understood by those skilled in this art, substantially any instrumentality located within the casing 4 will likewise constitute an obstruction from which echoes of pressure waves may be received.

For the purpose of producing pressure impulses within the well, any suitable mechanism may be employed such as an explosive shock may be produced as by firing a cartridge into the well or suddenly injecting into the well a slug of gas under pressure greater than that existing within the casing or by the sudden liberation of gas from the well or by producing within the casing of the well a strong acoustical wave, any of such pressure impulses creating a pressure wave which will travel down the well and will be reflected from each of the various obstructions encountered. In Fig. 1 I have illustrated such pressure impulse mechanism as of the type shown in my Patent No. 2,156,519, which includes as the mechanism for producing the pressure impulse a suitable tank 11 as a source of pressure which is coupled to a pressure chamber 12 which is in turn coupled to the well casing by means of a suitable pipe 13 which is connected to or communicates to the interior of the casing as indicated at 14. With this apparatus a charge of gas accumulated in the pressure chamber 12 at a pressure considerably higher than the gas pressure existing within the casing of the well may be suddenly liberated through a valve 15 into the annular space between the casing and the tube 6 to create a pressure impulse therein, the pressure wave resulting from which will travel down the well and be reflected or echoes thereof will be produced by each of the various obstructions in the well.

For the purpose of recording distinguishable echoes from each of these obstructions, any suitable pressure responsive apparatus may be coupled to the well casing in such manner as to be exposed to pressure variations within the casing and such pressure responsive apparatus may be employed to record the variations in pressure produced by the reception at the pressure responsive device of the echoes from the different obstructions. In Fig. 1 I have illustrated diagrammatically one form of such pressure responsive mechanism and recording apparatus as of the type illustrated in my Patent No. 2,156,519, including a diaphragm chamber 16 coupled as at 17 to the pipe 13 so as to expose to the gas pressure within the casing a diaphragm 18 which will receive and be moved varying amounts by the pressure variations resulting from the echoes from the various obstructions.

Suitable recording apparatus for recording the movements if the diaphragm 18 includes a source of light 19 which projects a beam of light through a lens or window 20 in the diaphragm chamber to impinge upon and be reflected by a mirror 21 back through the window 20 whence the beam may be directed by suitable reflectors 22 and lenses 23 as a pencil of light upon a light sensitive record chart 24 which is continuously driven at any desired speed value by means of a suitable motor 25.

It will be observed therefore that upon the creation of the pressure impulse the pressure wave will travel down the well and echoes from the successive obstructions encountered will be successively recorded upon the record tape 24 in the same sequential order in which the wave encounters these obstructions and the spacing of such waves along the record tape 24 will be accurately representative of the distance relations between the ground surface and the various obstructions.

Thus upon the record tape will be drawn a wavy line, the various peaks of which will represent the time or space or distance relation between these various obstructions. Reflections from joints 5a in the casing will be accurately represented upon the chart as negative peaks or depressions while the tubing collars 9 or other tubing joints will produce positive peaks representative of their locations while a peak of peculiar characteristic will be produced by the echo from the tubing catcher 10 and other peaks of peculiar characteristics will be produced by the echoes from the fluid surface 26.

As was explained in my Patent No. 2,156,519, the velocity of the pressure wave in different wells varies within relatively great limits depending upon the characteristics of the particular well under measurement such as gas density so that it is essential to know what space along the well is represented by the distance between the various peaks of the record and in order to provide this information a comparison may be made between the peaks resulting from echoes from two or more obstructions of known location or between the peak represented by the introduction of the pressure impulse and a peak resulting from the echo from an obstruction of known location. With this as a measure of the time, distance or space representative of a known distance, the space along the record tape for that particular well of peaks resulting from obstructions of unknown location may be accurately translated in terms of distance from the ground surface to the obstruction of unknown location.

However, such accuracy of measurement and determination can be accomplished only when the registrations of echoes from one character of obstruction can be readily distinguished from echoes resulting from another kind or character of obstruction. For example, tubing strings are ordinarily constructed of pipe sections, each of which is of known length, so that if the echoes from the tubing collars can be distinguished from the other echoes, the space on the record tape represented by these echoes will give an accurate measure of the velocity of the pressure wave in that particular well or an accurate determination of the space along the record tape which is represented by successive tubing collar echo registrations.

However, as will be readily observed, the many obstructions producing the many echoes will naturally produce interfering pressure waves and reverberations which may diminish, if not completely obliterate, the echoes from such tubing collars or other obstructions which are desired to be recorded and distinguished from other echoes, or the echoes from so many of the obstructions may register upon the tape in such over-lapping and interfering fashion as to render it substantially impossible to distinguish between the registrations by one character of obstructions from those produced by another character of obstruction.

In order to register the echoes from various obstructions in a manner which permits these echoes to be readily distinguishable from each other and to eliminate interference echoes, the pressure responsive portion of the system may be provided with an accenting means which, either by selectively amplifying certain of the frequencies over other frequencies or by suppressing certain undesired frequencies, will permit a greater differentiation between the desired frequency registrations and the undesired frequency registrations.

In Fig. 1 I have illustrated one manner of accenting these desirable echoes which is particularly adapted for the accenting of the echoes from successive tubing couplings or successive casing joints, which comprises a resonator 27 which is arranged to be responsive to the frequency of the regularly spaced tubing collar echoes or is arranged to be responsive to the casing joint echoes and thus producing a frequency which will beat with the tubing collar echoes or pipe joint echoes, whichever be selected, and cause them to be accented sufficiently to distinguish one from the other while at the same time tending to damp out or beat out any reverberation frequencies and the echoes not selected, which would otherwise interfere with the echoes desired to be registered.

The resonator 27 illustrated herein comprises a comparatively short length of small diameter pipe 28 as compared with the diameter of the large pipe 13 employed to couple the pressure responsive apparatus 16 to the well. The small diameter pipe 28 constitutes a neck opening into a relatively large volume compression chamber 27. By reason of the characteristics of this type of resonator, an extremely compact device may be employed which may be tuned to extremely low frequencies, thus permitting the employment of a resonator tuned to the fundamental frequency of the tubing collar echoes and yet occupy but a little space as compared with the length of pipe 13 which would otherwise be required to tune even to one of the harmonics of the low frequency tubing collar echoes. The diameter and length of the small pipe 28 and the volumetric content of the compression chamber 27 may be selected in accordance with the formula $$L = \pi \sqrt{\frac{Sl}{a}}$$

wherein
L = the known length of the tubing or casing sections between the joints or couplings;
S = the volume of the compression chamber;
$a$ = the cross sectional area of the small pipe 28;
l = the length of the small pipe 28.

Thus, for example, for testing wells where the tubing joint lengths are 22 feet I employ a chamber having a volume of 50 cubic inches communicating with the pressure responsive device through a ¼ inch diameter pipe, 10 inches long, to produce the necessary beat frequency to accent the registration of the tubing collar echoes from these particular wells.

The attachment end 30 of the tube 28 may be coupled to the pipe 13 or to the pressure responsive device 16 at any desirable and convenient location though for most effective results I find that the accenting device should be coupled into the system on the side of the pressure responsive mechanism opposite to the side exposed to the pressure variations in the well as, for example, in Fig. 1 the accenting mechanism is illustrated as being coupled to the diaphragm chamber on that side of the diaphragm 18 opposite to the side exposed to pipe 13.

It will be apparent therefore that a relatively small compression chamber 29 and a relatively short length of the pipe 28 is required, thus permitting the location of the entire pressure responsive mechanism, recording mechanism and impulse producing mechanism very close to the casing head of the well and thus avoiding the disadvantages of having to run considerable lengths of pipe between the casing head and such apparatus. Also it will be apparent that a great variety of short lengths of small diameter pipe may be readily provided and readily transported from well to well to permit accurate selection of the necessary length to conform with the particular conditions existing in any well.

The effect of the accenting mechanism when it is subjected to pressure waves is to set up oscillations of substantially fixed frequency which may be selected to "beat" with the tubing collar echo frequencies or casing joint echo frequencies and thus amplify them. The rate of attenuation of this oscillation is very rapid and unless is it acted upon by other pressure waves the oscillation die completely out in a small fraction of a second. If the rate of oscillations set up in this device correspond to the rate at which the echoes are received from tubing collars or casing joints, these echoes will be amplified, while echoes of other frequencies and those emanating from reverberations and local oscillations will be entirely suppressed.

While in Fig. 1 I have illustrated the manner in which my accenting device may be coupled to a pressure responsive device of the mechanical type such as shown in my prior Patent No. 2,156,159, it will be equally apparent that the same accenting apparatus may be employed in connection with other types of pressure responsive devices and in Fig. 2 I have illustrated such accenting means as being associated with a hot wire type of microphone 18a employed as the pressure responsive device. In this form of the apparatus the small pipe 28 of my accenting device has its attachment end 30 coupled directly to the end of the pipe 13 and the small diameter pipe provides a most effective location for the hot wire of the microphone since the velocity of the gas particles will be maximum within the small diameter to register the variations in the pressure resulting from the echoes emanating from the well.

While the pipe 28 of the accenting device, as hereinbefore described, may be constructed separately from the chamber 29 and different lengths of pipes 28 may be selected to produce the desired tuning effect, an adjustable accenting device may be provided by employing the construction illustrated in Fig. 2 in which the pipe 28 is provided with a slidable U-shaped extension 31 contained wholly within the chamber 29, one leg of the U-shaped extension 31 being telescopically assembled within the pipe 28 and adjustable relative thereto by means of a suitable adjusting screw 32 extending to the exterior of the chamber 29 where it may be provided with an operating handle 33. Thus by moving the extension 31 toward and away from the attachment end 30 of the pipe 28, the effective length of the pipe 28 may be adjusted in small increments to tune the apparatus to the desired frequency.

In Fig. 3 I have illustrated a modified form of compression chamber which is provided with an adjustment by which the frequency of the accenting device may be varied. In this form of the device the compression chamber 29 is constructed with an elongated substantially bottle shape having a cylindrical portion of considerable extent, within which is fitted a piston 34 adapted to be moved toward and away from the mouth of the chamber 29 by means of a screw 35 threaded into a boss 36 formed upon the outer end of the chamber 29 and provided with a suitable handle 37 by which the screw may be manipulated. Thus the effective volume of the compression chamber 29 may be increased or decreased by moving the piston toward or away from the mouth of the chamber 29, increase in the effective volume of the chamber 29 resulting in a decrease in the resonant frequency of the accenting device.

In Fig. 4 I have illustrated my accenting device as connected to an electrical pressure responsive device of the type illustrated in my copending application Serial No. 164,534, consisting essentially of a condenser type microphone in which a diaphragm 38 mounted within a diaphragm chamber 39 acts as a movable plate of a condenser, the stationary plate 40 of which is connected by means of a suitable electric conductor 41 to an electrical recording device of the character illustrated in my aforementioned copending application.

The accenting mechanism employed in connection with this type of pressure responsive device may be constructed similar to that shown in Figs. 1, 2 or 3 and connected to the system as indicated in Fig. 4 by coupling the small pipe 28 directly to the diaphragm chamber 39 at the side of the diaphragm opposite to the side exposed to pressure variations emanating from the well.

By employing my accenting mechanism in connection with the pressure impulse and echo registering devices as illustrated herein, the selection or adjustment of the length of the small diameter pipe of the accenting device or the selection of or adjustment of the effective volume of the compression chamber associated with the pipe may be effectively employed to set up pressure oscillations of selected frequencies and thus accent those echoes from the well whose frequencies correspond to or are multiples of the frequency for which my accenting device is selected. At the same time the oscillation frequencies resulting from the use of my accenting device will tend to damp out or destroy echoes whose frequencies do not correspond to the selected oscillation frequency and will produce a "filtering" effect minimizing or preventing the response of the recording apparatus to such undesired frequencies.

In this way successive tubing collar echoes from a tubing string, the sections of which are of substantially uniform length, may be so accented that a distinct peak will appear upon the record chart for each of the tubing collar echoes, permitting the distance between each of these peaks or a group of these peaks to be accurately measured. Thus by measuring the distance between two adjacent peaks or the distance along the tape which is occupied by a number of successive peaks, the space on the tape occupied thereby can be compared with the known length of the single tubing section between two adjacent collars or the known length of the group of tubing sections represented by the group of successive peaks and a measure or scale is thereby provided by which the distance along the tape between the peak representing the creation of the pressure impulse and another peak constituting the echo from an obstruction of unknown location may be accurately measured or computed. The accenting of the tubing collar echoes also permits the counting of each of the tubing collar peaks which appears upon the record between the peak produced by the pressure impulse and some other peak representing an echo from some obstruction at an unknown location so that by merely multiplying the length of a tubing section by the number of such tubing collar echo peaks, a direct mathematical computation of the location of the unknown obstruction may be had.

It frequently occurs that the tubing string is composed of pipe sections having couplings or joints which are substantially flush with the exterior surface of the pipe forming the tubing string so that little or no effective echo is produced by such joints. In such instances the accenting devices may be tuned to accent the echoes from the joints of the casing sections and these echoes registered, counted or measured along the record tape and used in the same manner as the tubing collar echoes described above.

At many wells pump equipment or other equipment surrounding the casing head so obstructs access to the casing head as to prevent the location of the pressure impulse producing apparatus and the echo receiving and registering apparatus close to the casing head, necessitating the use of relatively long lengths of pipe 13 extending between the casing head and such apparatus. The transmission of the pressure waves through such long lengths of pipe may set up within the pipe oscillations the frequencies of which may interfere seriously with the effective transmission of the desired pressure wave echoes, that is, the resonant frequency of such long lengths of pipe may produce interfering oscillations or harmonics tending to beat out or obliterate the very features which are desired to be most distinguishably recorded.

In order to prevent this undesirable interference, the resonant frequency of the pipes may be altered by interposing in these pipes restrictions as, for example, by partially closing the control valves disposed in the pipe 13 between the casing and the pressure responsive mechanism, two of such valves being ordinarily interposed in the pipe 13 illustrated in Fig. 1 at 42 and 43, respectively, the valve 43 being employed normally for the purpose of cutting off communication between the pipe 13 and the pressure responsive device at the time the pressure impulse is introduced into the well to prevent the violent shock thereof from injuring the relatively sensitive pressure responsive instruments. Thus the valve 43 may be but partially opened after the impulse is created and thus provide a restriction within the pipe 13 which will tend to change the effective length of this pipe to resonant response to some undesired frequency.

The valve 42 may be an additional valve interposed in the pipe 13 between the connection of the pressure chamber 12 to the pipe 13 and the connection of the pipe 13 to the well casing so that this valve by being partially closed provides a second restriction which assists in altering the effective length of the pipe 13 to prevent undesired resonant oscillations.

Figure 5:
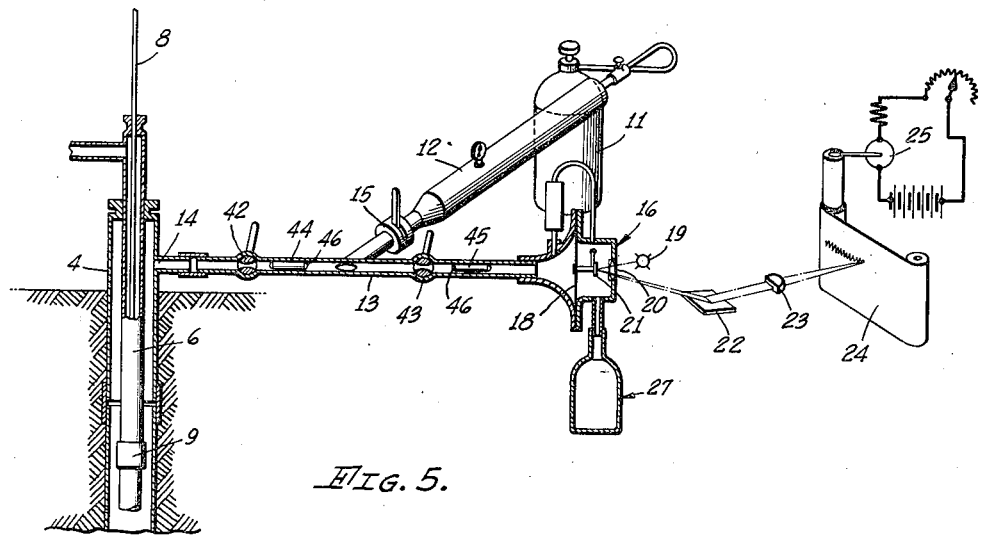
Fig. 5 is a diagrammatic view similar to Fig. 1 and illustrating the inclusion in the system of oscillation suppressors for suppressing or filtering out certain undesired echoes.

I have also discovered that a very effective way in which such undesired oscillations may be suppressed or damped out is by providing restricting plugs distributed along the interior of the pipe 13 somewhat as illustrated in Fig. 5, each of these suppressors constituting a short length of hard wood cylinder ranging from 6 to 12 inches in length and approximately 25 per cent smaller in diameter than the inside diameter of the pipe 13. The ends 46 of such blocks 44 are preferably routed or smoothed, these suppressors acting as wave reflectors as well as restricting devices for restricting the effective diameter of the interior of the pipe 13 and by their use many of the undesired frequencies may be completely suppressed or so minimized as not to effectively register upon the record tape.

While in some instances the employment of the suppressors 44 and 45 or the partial closing of the valves 42 and 43 may so damp out or suppress undesired frequencies as to permit the clearly distinguishable registration of desired echoes, such as from tubing collars, and thus act as accenting devices for accenting or differentiating between desired and undesired echoes. However, I prefer to use the small pipe and compression chamber type of accenting device in combination with such suppressing means as is illustrated in Fig. 5.

It will be apparent therefore that by employing an accenting device either of the tuning type or of the suppressing type, or the two combined as illustrated herein, I provide zones of small cross sectional area and zones or chambers of large cross sectional area which act to effectively differentiate between the desired and undesired frequency echoes to insure the distinguishable registration on the record tapes of the desired echoes and so minimizing the registration of the undesired echoes as to prevent their interference with the clear legibility of the registrations of the desired echoes.

While I have shown and described the preferred embodiment of my invention, I do not desire to be limited to any of the details of construction shown and described herein except as defined in the appended claims.

I claim:

1. The combination with a system for determining the location of obstructions in a well by the registration of echoes from the obstructions of a pressure impulse introduced into the well, which includes a pipe extending from and communicating with the well to define an enclosed path for pressure wave echoes, and echo registering means communicating with said pipe for receiving and registering the echoes; of a means for causing said registering means to register echoes, occurring at a given frequency, distinctly from other echoes comprising means associated with said pipe for providing a zone in said path of small cross sectional area opening into another zone of larger cross sectional area, the cross sectional area and length of said first named zone and the volume of said last named zone being so selected relative to each other as to produce acoustical oscillations of a frequency equal to or a multiple of said given frequency to amplify echoes of said given frequency.

2. The combination with a system for determining the location of obstructions in a well by the registration of echoes from the obstructions of a pressure impulse introduced into the well, which includes a pipe extending from and communicating with the well to define an enclosed path for pressure wave echoes, and echo registering means interposed in said pipe for receiving and registering the echoes; of a means for causing said registering means to register echoes, occurring at a given frequency, distinctly from other echoes, comprising a short length of tube having a diameter smaller than the pipe coupled to the pipe and terminating in a closed compression chamber of predetermined volume, the dimensions of said small pipe and said chamber being so selected as to produce oscillations of a frequency equal to or a multiple of said given frequency.

3. The combination with a system for determining the location of obstructions in a well by the registration of echoes from the obstructions of the pressure impulse introduced into the well, which includes a pipe extending from and communicating with the well to define an enclosed path for pressure impulse echoes, and echo registering means communicating with said pipe for receiving and registering the echoes; of a means for causing said registering means to register echoes occurring at a given frequency distinctly from other echoes, comprising a short extension of said pipe, said extension being of a smaller diameter than the pipe and terminating in an enclosed chamber with the echo receiving means located adjacent to one end of said small diameter pipe and said chamber having means for varying its volume to tune the small pipe and chamber to the echo frequency which it is desired to register.

4. The combination with a system for determining the location of obstructions in a well by the registration of echoes from the obstructions of the pressure impulse introduced into the well, which includes a pipe extending from and communicating with the well to define an enclosed path for pressure impulse echoes, and echo registering means communicating with said pipe for receiving and registering the echoes; of a means for causing said registering means to register echoes occurring at a given frequency distinctly from other echoes, comprising a short extension of said pipe, said extension being smaller than the pipe and having a suitable predetermined diameter to produce a resonant frequency which corresponds to the echo frequency which it is desired to register, said small diameter pipe terminating in an enclosed chamber with the echo receiving means located in or adjacent to one end of said small pipe.

5. The combination with a system for determining the location of obstructions in a well by the registration of echoes from the obstructions of the pressure impulse introduced into the well, which includes a pipe extending from and communicating with the well to define an enclosed path for pressure impulse echoes, and echo registering means communicating with said pipe for receiving and registering the echoes; of a means for causing said receiving and registering means to register echoes occurring at a given frequency distinctly from other echoes, comprising a short extension of said pipe disposed near said other point of communication of said registering means, said extension having a smaller diameter than the said pipe and terminating in an enclosed chamber, and means for varying the effective length of said small diameter pipe.

6. The combination with a system for determining the location of obstructions in a well by the registration of echoes from the obstructions of the pressure impulse introduced into the well, which includes a pipe extending from and communicating with the well to define an enclosed path for pressure impulse echoes, and echo registering means communicating with said pipe for receiving and registering the echoes; of a means for causing said receiving and registering means to register echoes occurring at a given frequency distinctly from other echoes, comprising a short extension of said pipe disposed near the point of communication of said registering means, said extension having a smaller diameter than the said pipe and terminating in an enclosed chamber, and means for varying the effective length of said small diameter pipe, said latter means comprising a telescoping section of said small pipe located inside of said enclosed chamber with external control means for varying the effective length of the enclosed section of small pipe.

7. The combination with a system for determining the location of obstructions in a well by the registration of echoes from the obstructions of the pressure impulse introduced into the well, which includes a pipe extending from and communicating with the well to define an enclosed path for pressure impulse echoes, and echo receiving and registering means communicating with said pipe for receiving and registering the echoes; of a means for causing said receiving and registering means to register echoes occurring at a given frequency distinctly from other echoes, comprising a short tubular addition to said pipe disposed near the point of communication of said registering means, said tubular addition having a smaller effective diameter than said pipe and terminating in an enclosed chamber with the echo receiving means located in or near one end of said small diameter tubular addition to said pipe and the predetermined length of said tubular addition being so selected that its resonant acoustical frequency will be substantially the same as the frequency of the echoes which are to be registered.

CRANFORD P. WALKER.